Nov. 5, 1968

C. E. BRICKER ET AL

Re. 26,484

WRAP-AROUND BRAKE

Original Filed Aug. 25, 1965

2 Sheets-Sheet 1

INVENTORS
CARL E. BRICKER
KENNETH P. HILLEGASS

BY

J. B. Holden
ATTORNEY

WRAP-AROUND BRAKE

Original Filed Aug. 25, 1965 2 Sheets-Sheet 2

INVENTORS
CARL E. BRICKER
BY KENNETH P. HILLEGASS
J. B. Holden
ATTORNEY

United States Patent Office

Re. 26,484
Reissued Nov. 5, 1968

26,484
WRAP-AROUND BRAKE

Carl E. Bricker, Cuyahoga Falls, and Kenneth P. Hillegass, Copley, Ohio, assignors to The Goodyear Tire & Rubber Company, Akron, Ohio, a corporation of Ohio Original No. 3,310,136, dated Mar. 21, 1967, Ser. No. 482,469, Aug. 25, 1965. Application for reissue June 13, 1967, Ser. No. 659,824
8 Claims. (Cl. 188—77)

Matter enclosed in heavy brackets [ ] appears in the original patent but forms no part of this reissue specification; matter printed in italics indicates the additions made by reissue.

*ABSTRACT OF THE DISCLOSURE*

This invention relates to a wrap type brake, primarily used on industrial machines, but not limited thereto, wherein a pair of brake bands are wrapped a plurality of times around a brake drum and are so mechanized to tighten on the drum in either direction of rotation thereof to effect the braking action.

Various types of industrial and automotive wrap around brakes have been proposed heretofore, but known brakes have been generally unsatisfactory in applying sufficient braking action to an extremely heavy machine or vehicle where a large load is or may be stopped and held for relatively long periods. The wrap around brake also has the tendency to lock when the brake bands are tightened on the drum, throwing the wheels which are braked into a skid, or in stopping a braked part with such a grab that the whole apparatus is wrenched. Known brakes have been expensive, not always reliable, and due to the heavy loads or vehicles being stopped, require considerable force to actuate the brake, even to operate the brake at a minimum braking standard.

The present invention is an improvement on that disclosed in Ser. No. 304,490, filed Aug. 26, 1963, entitled "Wrap Parking and Emergency Brake," now Patent No. 3,203,510.

It is the general object of the invention to avoid and overcome the foregoing difficulties and objections to prior art practices by providing a wrap type industrial or vehicular brake which is less expensive, is operated with less power, and which reduces grabbing and locking.

A further object of the invention is to provide a wrap type brake wherein two brake bands are wrapped in opposite helical fashion around a rotatable brake drum, and wherein one or the other of the bands is moved into braking engagement with the drum by means of a control shoe which is moved radially into engagement with the drum and which shoe then carries a limited distance circumferentially with the drum to thereby tighten one band on the drum.

Another object of the invention is the provision of a very powerful and strong brake held in braking position by relatively light spring means, and wherein the spring means and the brake can be released by relatively light power means.

Another object of the invention is the provision in a wrap around brake of a self-energizing type wherein the wrap around portion of the brake is applied by means of a shoe pushed radially against the drum and carried a limited distance circumferentially of the drum, the combination being characterized by an accurately controllable application of the pressure of the shoe against the drum to reduce locking up of the band on the drum.

A further object of the invention is to provide a wrap type brake which operates in both forward and reverse directions and where an extemely high braking force is exerted for a very small applied force so that excellent braking action is achieved for extremely heavy loads or vehicles and wherein the brake mechanism is simple, easily fabricated, durable and maintenance-free, and relatively inexpensive.

The aforesaid objects of the invention and other objects which will become apparent as the description proceeds are achieved by providing in a wrap type brake the combination of a rotatable brake drum, a stationary O-shaped frame, being curved to be symmetrical to the contour of said brake drum, being positioned to one side of the drum so as to lie closely adjacent but spaced from the outer periphery of the brake drum, a pair of non-rotatable brake bands, helically wound in opposite directions around the brake drum, each having one end secured to said O-shaped frame, a friction carrying brake shoe, pivotally mounted on said O-shaped frame, positioned between the other ends of said brake bands and such ends fastened in limited sliding relationship thereto, means for moving said brake shoe into engagement with said brake drum, whereby the brake shoe moves in the direction of rotation of the brake drum, thereby causing one of the brake bands to wrap itself around the brake drum to produce a self-energizing braking action.

For a better understanding of the invention reference should be made to the accompanying drawings, wherein.

Figure 1:
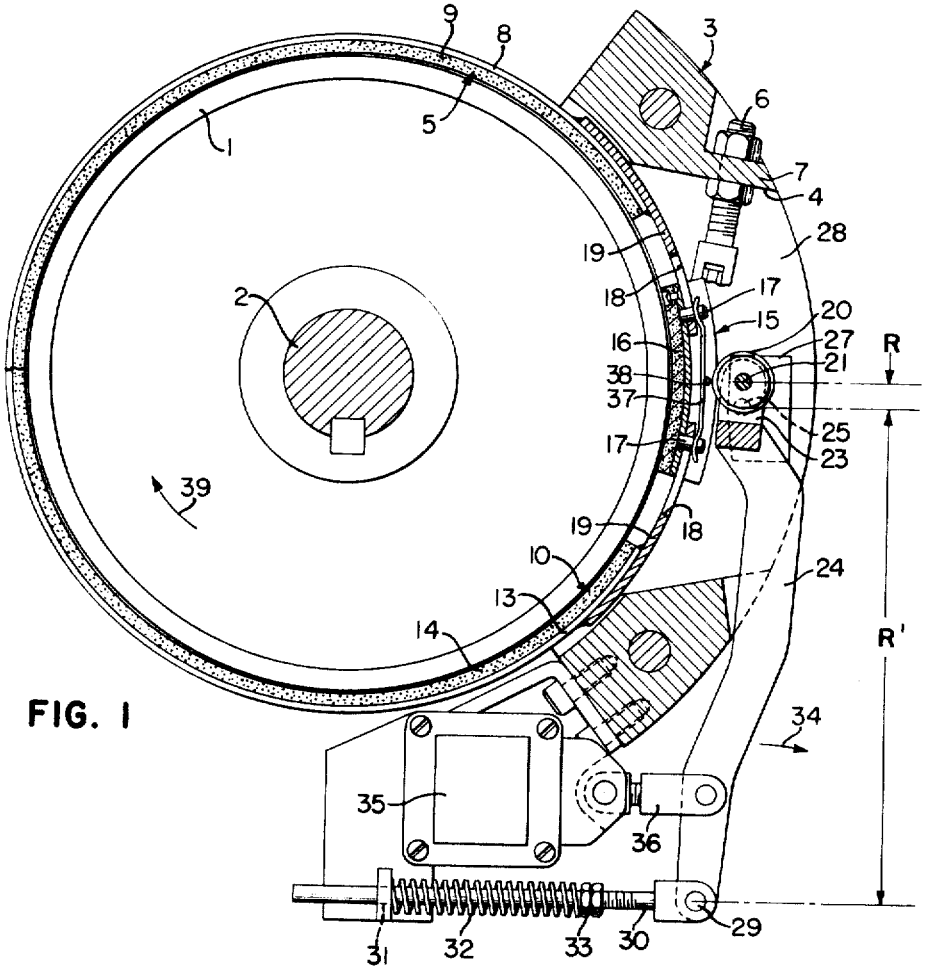
FIGURE 1 is an end view of one embodiment of the invention.

Although the principles of the invention are broadly applicable to a brake for any type of rotational apparatus, the invention is particularly designed as an industrial brake, for example, a marine hoist designed to stop and hold large loads, and hence it has been so illustrated and will be so described.

In the drawings, the numeral 1 indicates a rotatable brake drum of substantailly cylindrical shape carried upon an axle 2. Positioned to one side of the drum 1 is an O-shaped frame, indicated as a whole by the numeral 3, and having a window 4 therein. The O-shaped frame 3 is curved in the plane of the O to the peripheral contour of the brake drum 1 so as to lie closely adjacent but spaced from the outer periphery of the brake drum. The frame 3 is adapted to be secured in a stationary manner to some fixed part (not shown) of the apparatus rotatably supporting the axle 2 and the brake drum 1.

The stationary frame 3 supports a pair of helically wound brake bands extending in opposite directions around the brake drum 1. This is accomplished by providing a wrap around brake band 5 which is secured at one end by bolt means 6 to a flange 7 provided on the stationary frame 3. The bolt means 6 provide adjustment for tightening or loosening the wrap around band 5. The wrap around brake band 5 includes a flexible steel strap 8 having a facing 9 of friction material secured thereto, and with the band 5 extending from the anchoring bolt 6, for example, about two complete helical convolutions or wraps around the brake drum 1.

At the other end of the brake drum 1 a second wrap around brake band, indicated generally at 10, is provided, this band being adjustably anchored at one end by bolt means 11 carried in a flange 12 integral with the stationary frame 3. Wrap around band 10, like band 5, extends, for example, about two full helical convolutions or wraps around the drum 1, but in the opposite direction, with the unanchored end of the band terminating in circumferentially spaced relation from the unanchored end of the band 5. The wrap around band 10 is made from a flexible steel strap 13 having a friction material facing 14. Both of the wrap around bands 5 and 10 when unenergized have a clearance with the outer periphery of the drum, as will be understood.

Figure 3:
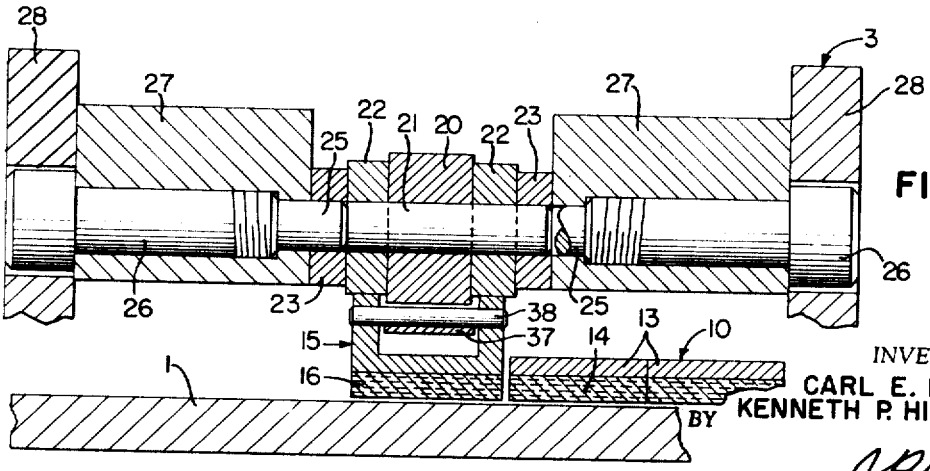
FIGURE 3 is a cross sectional view taken on line 3—3 of FIGURE 2.

In order to actuate one or the other of the wrap around bands 5 or 10 into braking engagement with the outer surface of the drum 1, a friction carrying shoes is positioned between the ends of the bands so that when the shoe is moved radially inward against the outer surface of the drum the shoe carries a short distance with the drum circumferentially to tighten one band on the drum. More particularly, this is accomplished by the provision of a shoe, indicated as a whole by the numeral 15, the shoe having a channel shape in cross section as best seen in FIGURE 3. Friction material 16 is secured to the face of the shoe 15, and the ends of the shoe 15 are slidably connected to the ends of the wrap around bands 5 and 10 by providing a pin 17 at each end of the shoe which is slidably received in a slot 18 in a metal strap 19 welded as an extension, respectively, to each end of the bands 5 and 10.

Mechanism is provided for radially moving the shoe 15 in against the surface of the brake drum 1, and in the form of the invention illustrated this mechanism includes a roller 20 having an enlarged center received between the side flanges of the channel shaped shoe 15 and slightly reduced diameter ends 22 which engage with the channel edges of the shoe 15 and roll thereon. The roller 20 is rotatably carried on a pin 21 which extends across a clevis 23 secured to or made a part of lever 24. Lever 24 is pivoted in the clevis portion thereof upon the reduced diameter ends 25 of bolts 26 extending through blocks 27 welded or otherwise secured to flanges 28 forming a part of stationary frame 3.

The distance between the pivot pin 21 for the roller 20 and the pivot for the clevis 23 of lever 24 is a distance R comprising a relatively short moment arm.

Figure 2:
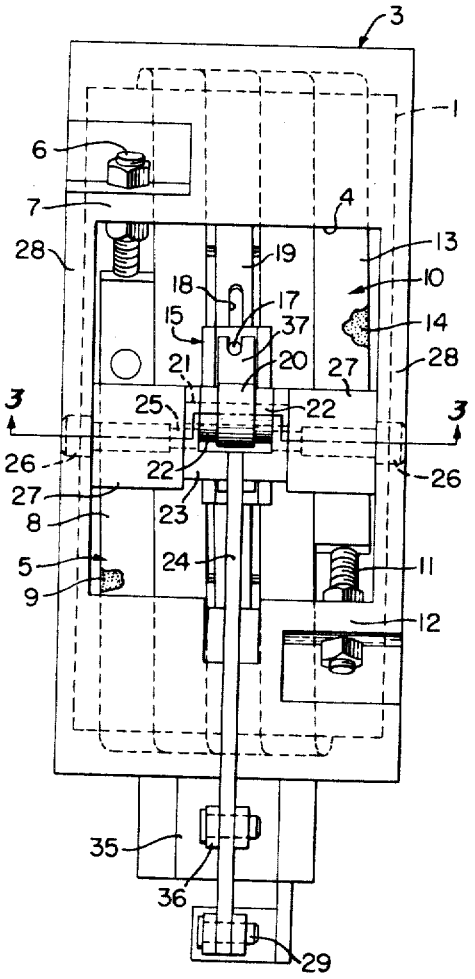
FIGURE 2 is a side elevation of the apparatus shown in FIGURE 1.

The lever arm 24 extends out of the window 4 of the stationary frame 3, in the manner best shown in FIGURES 1 and 2 of the drawings, with the end of the lever being pivotally secured at 29 to a rod 30 extending slidably through a hole in a flange 31 forming a part of stationary frame 3. Positioned on the rod 30 is a compression spring 32 whose length can be adjusted by nuts 33 threaded on the rod 30. The arrangement is such that the compression spring 32 acting on a moment arm R′ acts at all times to move the lever arm 24 in the direction of the arrow 34 to move the shoe 15 in against the outer periphery of the drum 1 to thereby apply the brake. In order to hold the brake unapplied, suitable adjustable pressure power means, such as an electric solenoid 35, are mounted upon the stationary frame 3, with this power means being pivotally connected by linkage 36 to the lever arm [34]*24*.

Positioned between the pins 17 of the shoe 15 is a ribbon spring 37 held in place by transverse pin 38, the ends of the spring 37 being bifurcated to fit around the pins 17 and engage with the ends of the straps 19.

In the operation of the brake described the full activation of the solenoid or other power means 35 normally holds the brake unapplied. To apply the brake the power means 35 are released whereupon the compression spring 32 moves lever 24 about pivots 25 to swing roller 20 radially inward against the brake shoe 15 to move the friction material 16 thereof against the rotating brake drum 1. As the shoe 15 engages the brake drum it tends to move with the brake drum and does a relatively short distance. Assuming that the brake drum 1 is rotating in the direction of the arrow 39 of FIGURE 1 then the shoe 15 moves downwardly carrying with it pin 17 which is engaged with the end of the slot 18 of the end of the wrap around brake 10 to thereby tighten this brake band against the brake drum and exert a very high stopping force on the drum. This is due in part to the tendency of the wrap around brake band 10 to wrap itself around the brake drum to product a self-energizing braking action.

During the downward movement of the brake shoe 15, the lower pin 17 thereof rides down into the slot 18 of the extending strap 19 of the wrap around brake band 5 so that this band is not applied in braking relation to the drum.

The relatively large difference between the moment arms R and R′ means that the roller 20 is moved radially inwardly against the brake shoe 15 by the action of the compression spring 32 with a relatively heavy force to achieve the braking operation described. In addition, the brake can be released by means of the power means 35 without these being of excessive size.

The brake works with equal effectiveness when the brake drum 1 is rotating in the direction opposite to the arrow 39 with the operation being the reverse of that previously described, and with wrap around band 5 being applied and wrap around band 10 being released.

Figure 4:
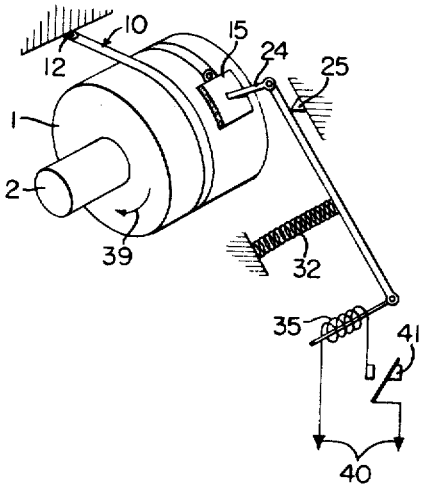
FIGURE 4 is a schematic perspective view illustrating the principles of operation of the brake of the invention.

The general principles of structure and operation of the brake of the invention can be most readily recognized and understood from a consideration of the schematic view of FIGURE 4. In this figure, brake drum 1 turning or attempting to turn in the direction of arrow 39 is shown with one wrap around band 10 anchored at one end 12 and connected at its other end to shoe 15. Shoe 15 is connected to lever 24 carried pivotally on fulcrum 25 so that the compression spring 32 normally pushes lever 24 to engage the shoe 15 with the drum to tighten band 10 against the drum. Solenoid 35 when energized from power source 40 through control switch 41 pulls lever 24 in the opposite direction to compress spring 32 and causes shoe 15 to move away from the drum and release the brake band 10 from the drum.

A feature of the invention is that the solenoid 35 when initially operated to overcome the force of the spring 32 draws a relatively heavy current and applies the necessary force to overcome the spring. However, once the solenoid has operated and has moved to the brake release position the plunger of the solenoid effectively closes the magnetic core of the solenoid, and with the solenoid coil of high impedance very little current flows in the solenoid thereby reducing the cost of brake operation.

While in accordance with the patent statutes one best known embodiment of the invention has been illustrated and described in detail, it is to be particularly understood that the invention is not limited thereto or thereby, but that the inventive scope is defined in the appended claims.

What is claimed is:

[1. In a brake, the combination of a rotatable brake drum, a stationary O-shaped frame, curved to be concentric to the contour of said brake drum, and positioned to one cylindrical side of the drum so as to lie closely adjacent but spaced from the outer periphery of the brake drum, a pair of non-rotatable brake bands, helically wound in opposite directions around the brake drum, each having one end secured to said O-shaped frame, a brake shoe movably mounted on said O-shaped frame, positioned between the other ends of said brake bands and such other ends fastened in limited sliding relationship thereto, and means for moving said brake shoe into engagement with said brake drum, whereby the brake shoe moves a limited distance in the direction of rotation of the brake drum, thereby causing one of the brake bands to wrap itself around the brake drum to produce a self-energizing braking action.]

2. In a brake, the combination of a rotatable brake drum, a stationary O-shaped frame, being curved to be similar to the contour of said brake drum, positioned to one side of the drum so as to lie closely adjacent but spaced from the outer periphery of the brake drum, and having a window therein, a pair of non-rotatable brake bands, helically wound in opposite directions around the brake drum, each having one end secured to said O-shaped frame, a friction carrying brake shoe, pivotally mounted on said O-shaped frame for limited movement radially and circumferentially of the drum and positioned between the other ends of said brake bands, means connecting said other ends in limited sliding relationship to the brake shoe, a lever arm, pivotally secured to said brake shoe, extending out of the window in said frame means, and fixedly positioned power means, pivotally secured to the other end of said lever arm to move said brake shoe into engagement with said brake drum.

3. In a brake, the combination of a rotatable brake drum, a stationary O-shaped frame, being positioned to one side of the drum so as to lie closely adjacent but spaced from the outer periphery of the brake drum, and having a window therein, a pair of non-rotatable brake bands, helically wound in opposite directions around the brake drum, each having one end secured to said frame, a friction carrying brake shoe, movably mounted on said O-shaped frame, positioned between the other ends of said brake bands, pins, mounted on said brake shoe, each being slidably secured in a slot positioned in each other end of said brake bands, a lever arm, pivotally secured to said brake shoe, extending out of the window in said frame means, and power means, pivotally secured to the other end of said lever arm to move said brake shoe into engagement with said brake drum.

4. In a brake, the combination of a rotatable cylinder-shaped member, a stationary frame, a pair of non-rotatable brake bands, helically wound in opposite directions around the member, each having one end secured to said stationary frame, a brake shoe, movably mounted on said stationary frame for limited radial and circumferential movement and positioned between the other ends of said brake bands and secured in limited sliding relationship thereto, spring means holding said brake shoe in engagement with said member, and adjustable force power means for opposing and selectively overcoming the force of the spring means.

5. In a brake, the combination of a rotatable brake drum, a non-rotatable frame means, a brake shoe, movably mounted on said frame means for movement from and to the peripheral contour of said brake drum, non-rotatable brake bands wound in helical convolutions around the outer peripheral surface of said brake drum but out of engagement therewith, each having one end secured to said frame means, each having the other end fastened in limited sliding relationship to said brake shoe, a lever arm, pivotally secured to said brake shoe, and power means carried on the frame means and pivotally secured to said lever arm to move said brake shoe into engagement with said brake drum to thereby move the shoe partially with the drum and tighten a brake band around the drum.

6. In a brake, the combination of a rotatable brake drum, a stationary frame, a brake band, helically wound around the brake drum, having one end secured to said stationary frame, a brake shoe, fastened in limited sliding relationship to the other end of said brake band, lever means, secured to said brake shoe, spring means secured to said lever means for holding said brake shoe in engagement with said brake drum, and electric solenoid power means for overcoming the force of the said spring means to move the brake shoe out of engagement with the drum and release the brake, said solenoid power means drawing very little current when fully in brake release position.

*7. In a brake, the combination of*

*a rotatable brake drum,*

*a stationary O-shaped frame, being curved to be similar to the contour of said brake drum, positioned to one side of the drum so as to lie closely adjacent, but spaced from the outer periphery of the brake drum, and having a window therein,*

*a pair of non-rotatable brake bands, helically wound in opposite directions around the brake drum, each having one end secured to said O-shaped frame,*

*lever means pivotally mounted on said O-shaped frame for limited movement radially and circumferentially of the drum and means connecting said other ends of the bands in limited sliding relationship to the lever arm, and fixedly positioned power means pivotally secured to the other end of said lever arm to move said arm so as to move said bands into engagement with said brake drum.*

*8. A brake according to claim 7 where the non-rotatable bands are of approximately the same length, and with the secured ends and the free ends being aligned in substantially the same radial relationship with relation to the drum before the free ends of the drum are moved into engagement therewith.*

*9. In a brake the combination of*

*a rotatable brake drum,*

*a stationary frame,*

*a brake band, helically wound around the brake drum, having one end secured to said stationary frame,*

*lever means positioned in limited sliding relationship to the other end of said brake band,*

*spring means secured to said lever means holding said band in engagement with said brake drum, and*

*electric solenoid power means for overcoming the force of said spring means to move the brake band out of engagement with the drum and release the brake, said solenoid power means drawing very little current when fully in brake release position.*

References Cited

The following references, cited by the Examiner, are of record in the patented file of this patent or the original patent.

UNITED STATES PATENTS

| | | | |
|---|---|---|---|
| 2,637,415 | 5/1953 | Winther | 188—77 X |
| 2,804,945 | 9/1954 | Thierman | 188—77 |
| 3,203,510 | 8/1965 | Hillegass et al. | 188—77 |

FOREIGN PATENTS

| | | |
|---|---|---|
| 40,556 | 4/1916 | Sweden. |
| 133,967 | 9/1929 | Switzerland. |

DUANE A. REGER, *Primary Examiner.*